United States Patent [19]

Morrison

[11] 4,067,542
[45] Jan. 10, 1978

[54] VALVE SEAT CONSTRUCTION HAVING A RESILIENT MEMBER AROUND THE PERIMETER OF THE SEAT MEMBER

[75] Inventor: Bertram L. Morrison, Houston, Tex.

[73] Assignee: ACF Industries, Incorporated, New York, N.Y.

[21] Appl. No.: 758,115

[22] Filed: Jan. 10, 1977

[51] Int. Cl.² ............................................. F16K 3/00
[52] U.S. Cl. .................................... 251/328; 251/174
[58] Field of Search ............... 251/328, 170, 171, 172, 251/174

[56] References Cited

U.S. PATENT DOCUMENTS

| | | | |
|---|---|---|---|
| 3,305,213 | 2/1967 | Grove | 251/328 |
| 3,359,999 | 12/1967 | Mueller | 251/174 X |

*Primary Examiner*—Harold W. Weakley
*Attorney, Agent, or Firm*—Eugene N. Riddle

[57] ABSTRACT

A gate valve structure having a valve body with a body recess therein surrounding the valve bore and an annular floating seat member or ring in the body recess for contacting a gate member. The seat ring has an annular groove around a mid-portion of its outer periphery with a resilient sealing member mounted therein. The body recess is defined by a pair of radially stepped wall portions having different diameters and joined by an abutment. The seat ring has a pair of complementary stepped outer peripheral portions facing the wall portions with the groove being positioned between the stepped portions of the seat ring. The seat ring is positioned in the recess and the annular resilient sealing member between opposed sides of the groove is compressed between the abutment on the valve body and an opposed side of the groove in the seat ring to provide sealing between the seat ring and the body and to resiliently urge the seat ring toward the gate member.

9 Claims, 8 Drawing Figures

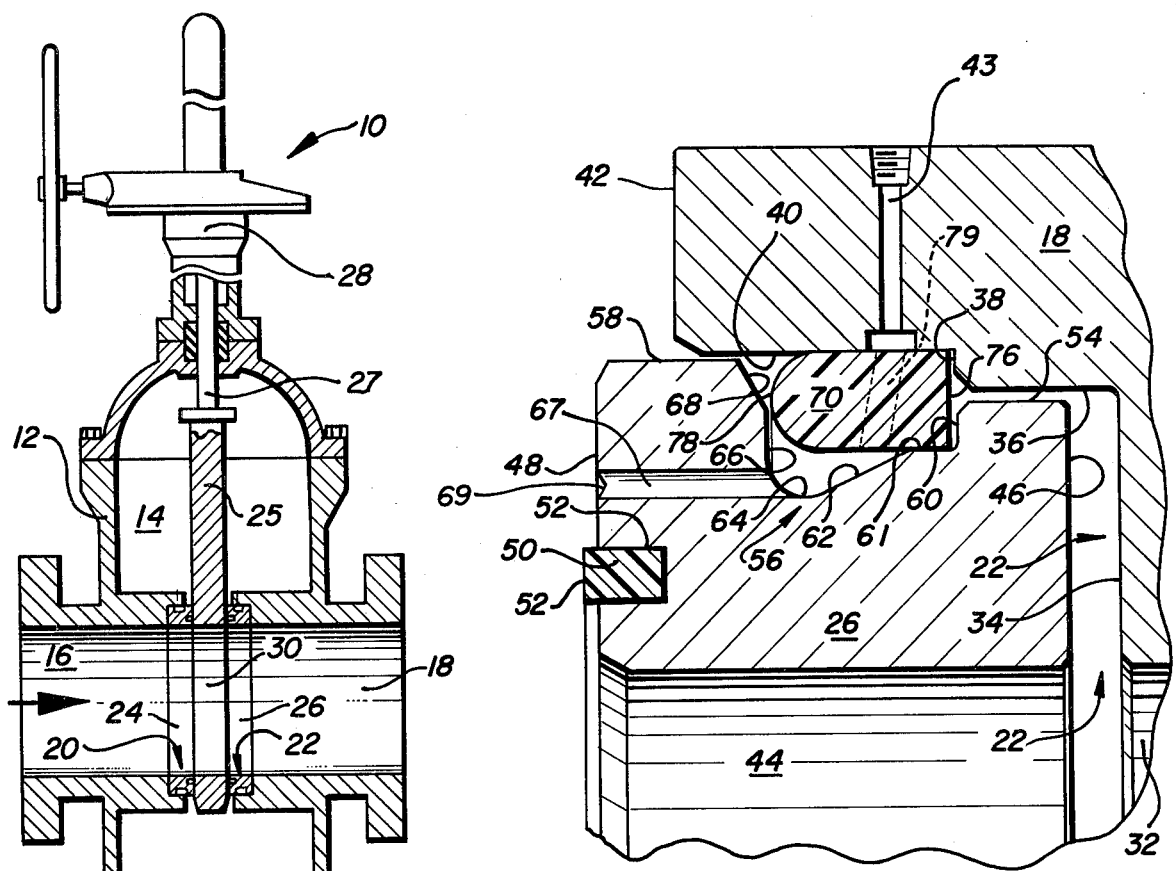

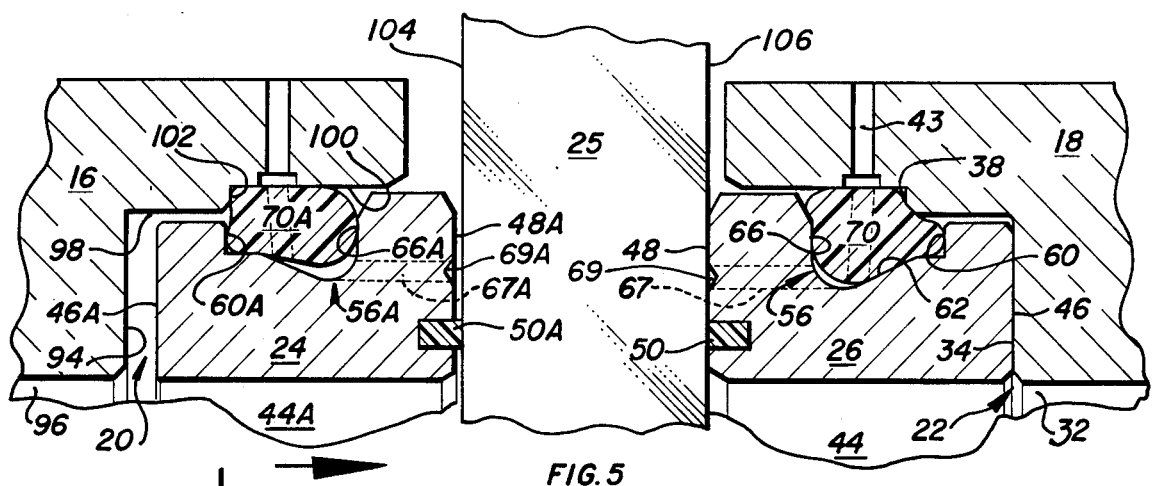
FIG. 5
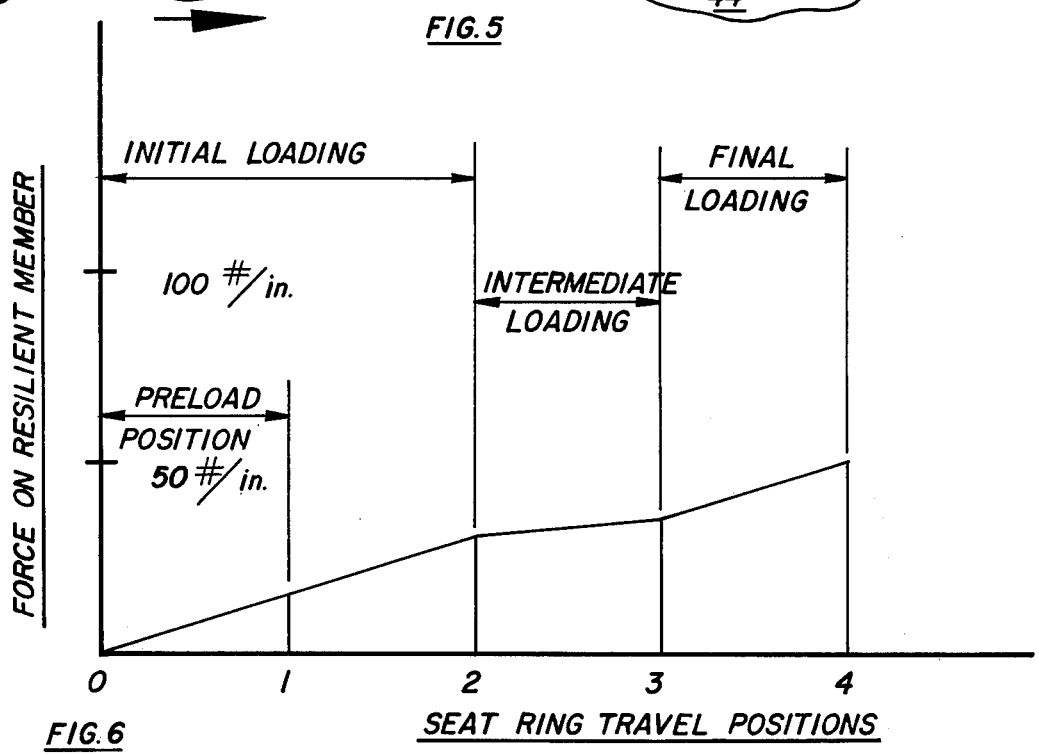
FIG. 6
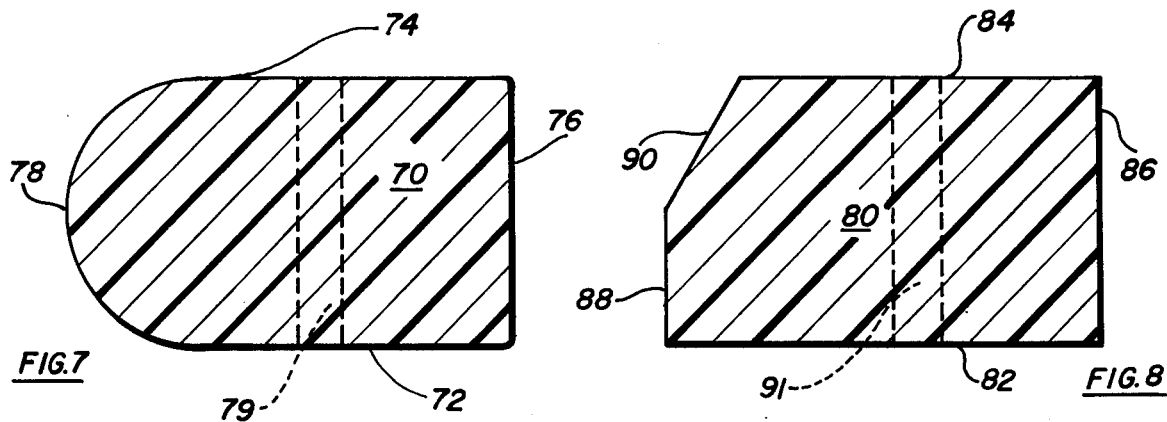
FIG. 7
FIG. 8

VALVE SEAT CONSTRUCTION HAVING A RESILIENT MEMBER AROUND THE PERIMETER OF THE SEAT MEMBER

BACKGROUND OF THE INVENTION

This invention is related to valve seat assemblies having a seat ring which incorporates a resilient deformable sealing member around a peripheral portion thereof to function as a seal between the seat member and the adjacent valve body, and as a spring to urge the seat ring into contact with the valve member. More particularly this invention is related to a seat assembly for a parallel sided gate valve member. The seat assembly uses an annular resilient member positioned around the perimeter of the seat member to seal around the seat member and at the same time be compressed to urge the seat member or ring toward the gate member.

Several valve seat assemblies are known in the art which utilize an annular resilient sealing member around the periphery of a seat ring to function as a seal and as a spring to urge the seat member toward the valve member. However, these constructions are limited to resilient members mounted at the outer extremity of the seat member or in the outer rectangular corner portion of the seat pocket as formed by the seat recess side wall and end wall. Constructions of this type in which the resilient member functions both as a spring and a seal are shown in the U.S. Pat. Nos. to R. M. Estes, et al. 3,078,865, to C. E. Anderson, et al. 2,985,421, and to L. F. Eckerd, Jr. 3,006,599. In these referenced prior art devices the resilient member is positioned on the outer peripheral portion of the seat members in a chamber formed by a peripheral groove in the outer end of the seat member and a corner of the bottom portion of the body recess. In order for these seat constructions to function adequately they must be constructed with considerable control of their dimensions. Dimensional tolerances of the recess, the seat member, and the resilient member must be quite small for the constructions to function properly. In order that these prior art seat constructions function properly the tolerances of the parts concerned as well as the dimension of the gate member between opposed sealing surfaces thereof must be maintained within quite small ranges to insure sealing and to prevent compression of the resilient member beyond its elastic limit. In general, tolerances of the known prior art devices must be very closely controlled and this is an expensive and very time consuming procedure for a manufacturer because of the precise control necessary in all steps of the machining of such parts in addition to the quantity of parts which must be scrapped and reworked because their tolerances fall outside of the allowable range. Also, displacement of the seat members is typically quite small to prevent excessive compression of the resilient member and to lessen the resilient spring effect of compressing a resilient member.

Another disadvantage of the prior art valve seat constructions is that the resilient sealing members must be sized such that they can be retained over the perimeter of the seat member as the seat member is inserted into the recess and this requires a greater force to displace the resilient member radially outward for sealing against the recess annular wall.

SUMMARY OF THE INVENTION

In an embodiment of the valve seat construction of this invention a gate valve structure has an annular body recess formed around the bore and communicating to the valve chamber. A seat member or ring is mounted in the recess and has an annular groove around a mid-portion of its outer periphery to receive and mount a resilient member. The body recess is defined by radially stepped wall portions of different diameters joined by an abutment. The seat ring has complementary stepped outer peripheral portions with the groove being positioned between the stepped outer peripheral portions of the seat ring. The seat ring is positioned in the recess and the annular resilient sealing member between opposed sides of the groove is compressed between the abutment on the body and the opposed sides of the groove to provide for sealing between the seat ring and the body recess and to resiliently urge the seat ring toward the gate member.

One object of this invention is to provide a valve seat construction overcoming the aforementioned disadvantages of the prior art devices.

Still, one other object of this invention is to provide a valve seat construction which uses a resilient member mounted in a groove around the perimeter of the seat member to function as a seal between the seat member and the recess and to function as a spring like element urging the seat member toward the valve member.

Still another object of this invention is to provide a valve seat construction which has a resilient member mounted in a groove around the seat member to provide for easy installation of the seat member into the recess thereby simplifying assembling of the valve and at the same time providing a seat construction which does not require extremely finely controlled tolerances of the parts to insure operation of the valve seat construction.

Yet another object of this invention is to provide a valve seat construction which has a seat ring with a resilient member mounted in a groove therearound wherein the groove is shaped such that the resilient member is subjected to both shear and bending as well as compressive forces as the seat member is displaced from an assembled position to a completely displaced position where the seat member rests against the end wall of the associated recess.

Various other objects, advantages, and features of this invention will become apparent to those skilled in the art from the following discussion, taken in conjunction with the accompanying drawings, in which:

DESCRIPTION OF THE DRAWINGS

FIG. 1 is a sectional view of a gate valve, certain parts being in elevation, and having the novel valve seat construction of this invention;

FIG. 2 is an enlarged cross-sectional view of the downstream seat assembly including a portion of the associated recess with the seat member placed in the recess in a position such that the resilient member is not compressed;

FIG. 3 is an enlarged fragment of FIG. 1 showing the seat assemblies in an assembled and non-fluid pressure loaded position wherein the gate member and the seat members are centrally disposed between the recesses;

FIG. 4 is a cross-sectional view similar to FIG. 3 but showing the gate member and the seat members being displaced a slight amount in the downstream direction by fluid pressure against the gate member from the upstream direction as indicated by the arrow;

FIG. 5 is a cross-sectional view similar to FIG. 4 wherein the seat members and the gate member are displaced to their ultimate downstream position with the downstream seat member resting against the recess end wall;

FIG. 6 is a force-travel diagram illustrating the seat ring force resulting from compression of the resilient member versus travel of the seat member from the unloaded position to the ultimate downstream position;

FIG. 7 is an enlarged cross-sectional view of the resilient member shown in seat assembly illustrated in FIGS. 1-5; and FIG. 8 is an enlarged cross-sectional view of another embodiment for the resilient member.

The following is a discussion and description of preferred specific embodiments of the valve seat construction of this invention, such being made with reference to the drawings whereupon the same reference numerals are used to indicate the same or similar parts and/or structure. It is to be understood that such discussion and description is not to unduly limit the scope of the invention.

DETAILED DESCRIPTION

Referring to the drawings and in particular to FIG. 1 where a gate valve, indicated generally at 10, is shown utilizing the valve seat construction of the invention. Gate valve 10 includes a valve body 12 defining a valve chamber 14 therein and having a bore therethrough. Inlet and outlet conduit segments 16 and 18 of valve body 12 form fluid connections for the valve and locate the bore. Recesses 20 and 22 are formed in the adjacent inner end portions of the upstream and downstream conduit segments 16 and 18 respectively. Upstream and downstream seat members or rings 24 and 26 are respectively mounted in recesses 20 and 22. A parallel sided gate member 25 is mounted in valve chamber 14 between seat members 24 and 26 and movable between the open and closed positions. Gate member 25 has a stem 27 mounted on the upper end portion thereof and extending through valve body 12 and connected to an actuator 28 for displacing same. Gate member 25 is shown as a through conduit style gate member which is provided with a solid or impervious portion on the upper portion thereof and an aperture 30 through the lower portion thereof which aligns with the bore in the open position.

FIG. 2 shows one side of the downstream seat assembly and the associated recess in cross-section in a position wherein the resilient member is not compressed. Recess 22 is formed in the innermost end portion of conduit segment 18. Conduit segment 18 has an internal bore 32 longitudinally therethrough and defining a portion of the valve bore. Recess 22 is defined by an end wall 34 radially disposed relative to bore 32 and joining the annular outer wall of the recess. The downstream recess annular outer wall includes a reduced diameter portion 36 joining end wall 34 and extending to a midpoint of the recess where a radially disposed abutment 38 joins the reduced diameter wall portion with a large diameter annular wall portion 40. Larger diameter wall portion 40 extends from abutment 38 to the conduit inner end 42. The juncture of reduced diameter annular wall 36 and radially disposed abutment 38 as well as the juncture of larger diameter radial wall 40 and conduit end 42 are provided with chamfered surfaces to avoid gouging of seat member 26 and the seal member on assembly. An aperture 43 located transversely through conduit 18 opens on one end to larger diameter wall portion 40 and on the other end to an injector port (not shown) mounted through valve body 12. A plurality of sealant apertures 43 can be provided. An annular groove in surface 40 connects sealant injection apertures 43 around the seat annulus of recess 22.

Seat member 26 has an annular bore 44 therethrough coaxial with bore 32. Seat member 26 has a radially disposed end wall 46 transverse to seat bore 44 and extending to the peripheral wall or surface of the seat member. An annular sealing face 48 on the opposite side of the seat member extends transversely to bore 44 from the bore to seat member peripheral wall. An annular resilient deformable seal member 50 is mounted in a groove 52 in annular sealing face 48. Seal member 50 extends from sealing face 48 and has a sealing edge surface 52 on its outer portion to contact the sealing surface of gate member 25. The peripheral wall of seat member 26 includes a reduced diameter portion 54 adjoining outer end wall 46, a groove indicated generally at 56 in a mid-portion thereof, and a large diameter portion 58 joining annular sealing face 48. Peripheral wall portions 54 and 58 thus form radially spaced stepped wall surfaces. Groove 56 is defined between parallel sides or abutments 60 and 66 connected by a bottom surface defined by a shallow bottom surface 61 extending from side 60 in a direction generally coaxial with bore 44, an intermediate inclined bottom surface 62 extending from shallow portion 61, and a beveled deep bottom surface 64 extending from intermediate bottom surface 62 to side 66. An inclined surface portion 68 extends between side 66 and peripheral wall portion 58. Side 66 and inclined surface portion 68 extends between side 66 and peripheral wall portion 58. Side 66 and inclined surface portion 68 form an abutment which contacts one end of an annular resilient member 70 positioned within groove 56. A passageway 67 is provided through seat member 26 joining the bottom portion of groove 56 on one end and opening on the other end to a connecting circular groove 69 in sealing face 48. A plurality of apertures like aperture 67 can be provided around the seat member. A pocket or chamber for resilient member 70 is formed by groove 56 and the recess formed adjacent abutment 38. The shape and size of the pocket for resilient member 70 changes with the position of seat member 26 in the recess. The various surfaces defining the pocket contact and deform both the end and side portion of resilient member 70.

It is to be understood that groove 56 can be given a shape or form other than shown in the drawings, such as with the deeper bottom portion thereof on the opposite side of groove 56 or with resilient member 70 engaging a mid-portion of the groove. An important feature of groove 56 is that it is shaped so that the resilient member is initially loaded in shear, then subsequently loaded to cause bending of the resilient member upon further displacement of the seat member to a finally compressed position. Another feature of the groove and recess shape is that the resilient member is designed so that it is not compressed beyond its elastic limit when the seat member is in a maximum displaced position.

Resilient member 70 is shown in its free uncompressed form in FIGS. 2 and 7 and is elongated in a direction coaxial with the bore of seat member 26. Resilient member 70 has parallel inner and outer annular sides 72 and 74. One end 76 of seat member 70 is transverse to sides 72 and 74 and the opposite end thereof 78 is curved in an arcuate or substantially convex shape and joining sides 72 and 74. A plurality of spaced apart apertures are provided through resilient member 70 joining sides 72 and 74 as shown by the single aperture 79 illustrated in FIG. 7. Apertures 79 provide for fluid communication through resilient member 70 between sealant injection aperture 43 and groove 56 such that a sealant or the like can be passed from the exterior of the valve to the seat sealing face through resilient member 70, groove 56 and apertures 42 and 67. Resilient member 70 rests in the pocket formed by groove 56 and the adjacent body recess adjacent abutment 38 with flat end 76 positioned adjacent abutments 38 and 60 and arcuate end 78 positioned adjacent side 68 defining groove 56. FIG. 2 shows the seat assembly with resilient member 70 having opposite ends 76 and 78 thereof slightly spaced from the contact surfaces. Resilient member 70 can be constructed of an elastomeric or plastic material having resilient characteristics suitable to seal between the associated seat member and the adjacent body surface, and to create sufficient spring force upon deformation to urge seat member 70 firmly toward gate member 25. For example, materials such as Buna-N and epichlorohydrin can be used for resilient member 70.

It is to be understood that resilient member 70 can have a cross-sectional shape other than that shown in FIGS. 1–7. A separate embodiment of the resilient member is shown in FIG. 8 and is indicated generally at 80. Annular resilient member 80 includes parallel inner and outer sides 82, 84, and end 86 connecting sides 82, 84 adjacent one end of resilient member 80. On the opposite end of resilient member 80 an end surface portion 88 extends radially outwardly from side 82 and joins at the middle of resilient member 80 an inclined surface 90 that extends from side 84. A plurality of apertures 91 are provided through resilient member 80. It is to be understood that other shapes of the resilient member can be utilized in the seat construction of this invention without departing from the spirit or the scope of the invention.

Upstream recess 20 is formed in inlet conduit segment 16 in a shape substantially identical to the shape of downstream recess 22 and such includes an end wall 94 extending radially outward from conduit bore 96 to the body recess defined by stepped portions 98 and 100 of different diameters joined by an abutment 102 extending in a radial direction from bore 96. Both upstream recess 20 and downstream recess 22 face valve chamber 14 at opposing ends 103 and 42 of conduit segments 16 and 18 respectively. It is to be noted that the depth of recesses 20 and 22 is such that sealing faces 48A and 48 of respective seat members 24 and 26 extend beyond the adjacent conduit ends 103 and 42 respectively. Gate member 24 is provided with essentially parallel sides forming upstream and downstream sealing surfaces 104 and 106 respectively.

In valve 10 the seat members 24 and 26 are constructed in an identical fashion and can be interchangeable at the desire of the user. For convenience in describing the complete seat assembly, its operational characteristics and function, upstream seat member 24 is identified with the same numerals as downstream seat member 26 followed by the capital letter "A".

In assembly of a valve having the valve seat construction of this invention the seat members are placed in their respective seat recesses or pockets and retracted into the recesses to allow the insertion of gate member 24 therebetween without damaging the face seals. When seat members 24 and 26 are released they are positioned substantially as shown in FIG. 3 wherein resilient members 70A and 70 are compressed to a preload position. In this preload position face seal members 50A and 50 are sealingly engaged with respective gate sealing surfaces 104 and 106 due to the preload force created by the compression of the resilient members. Resilient members 70A and 70 are compressed between the radial abutment of the respective body recess and the longest side of the respective grooves. The outwardly disposed ends of the respective upstream and downstream resilient members are deformed between body recess abutments 102 and 38, and groove sides 66A and 66 respectively. During deformation of the resilient members from a non-load position shown in FIG. 2 to the preload position shown in FIG. 3, and to the slightly displaced position shown in FIG. 4, the resilient members are subjected to shear loading because they are confined between opposed abutments corners defining the associated grooves and body recesses. In this preload position the spring force created by the resilient members is sufficient to establish fluid-tight sealing between seal members 50A, 50 and gate member 24 which is sufficient for low pressure sealing.

Referring to FIG. 6 a theoretical force-travel diagram is illustrated representing forces on the downstream resilient member as a result of seat ring travel from the unloaded position shown in FIG. 2 to the maximum loaded position shown in FIG. 5. The resilient member illustrated in FIG. 6 was of an epichlorohydrin material of a seventy (70) durometer hardness and was around $\frac{1}{2}$ inch in thickness and $\frac{3}{4}$ inch in length. The force illustrated is a combined bending, compressive, and shear force and is in pounds per inch of circumference of the resilient member. The resilient member was employed in a valve having a 24 inch bore. The seat ring travel is illustrated at four travel positions. The first position is the preload position at around 1/16 inch of displacement, the second position at around 2/16 inch of displacement, the third position at around 3/16 inch of total displacement, and the fourth position at final loading at around 4/16 inch of total displacement. On the initial portion of seat ring travel illustrated in FIG. 6 as being between positions 0 and 2, the resilient member is subjected to a force consisting of primarily a shear force and some bending force. The shear component of this force is due to abutment 38 moving toward side 66 which causes oppositely oriented forces to be exerted on the resilient member. The bending component of this force is due to displacement of abutment 38 to a position generally out of alignment with side 60 which results in a radially inward bending of the resilient member. Radially inward bending of the resilient member is opposed by frictional contact between the groove abutment 66 and resilient member convex portion 78. This force is a function of the displacement between abutments 38 and 60, the frictional force between the contacting surfaces acting on resilient member 70 and the stiffness of the resilient member. This frictional force is governed by the coefficient of friction of the materials involved and the fluid medium passing through the valve. For example, an oil lading passing through valve 10 would result in a lesser coefficient of friction than would a dry gas or a fluid containing a particulate material. In this initial part of seat travel the preload position of the seat member is indicated at position 1 in FIG. 6 which corresponds to the position of the seat assembly illustrated in FIG. 3. The position of the seat assembly shown in FIG. 4 illustrates the arrangement of the seat assembly in a position lying between positions 1 and 3 on the force-travel diagram.

In the intermediate portion of seat ring travel illustrated in FIG. 6 as being between positions 2 and 3, the resilient member is subjected to a force consisting of primarily a bending force, partially a shear force, and partially a compressive force. The shear component is due to the factors described above. The bending component is due to the widening separation of abutments 60 and 38, and the greater displacement or bending of resilient member into the deeper or bottom portion of groove 56. This greater displacement results in higher bending forces than present in the initial portion of seat ring travel. The compression component is due to the deformation of resilient member 70 to a position such that it substantially fills groove 56, and continued displacement of seat ring 26 causes some compression or reduction in the overall cross-sectional area of the resilient member. The friction between resilient member 70 and groove 56 has a substantial bearing on the contribution of the bending and compression components because a high friction will oppose displacement of resilient member 70 into groove 56 and thus result in a larger bending component and a smaller compression component. On the other hand, a low friction will allow resilient member 70 to move deeper into groove 56 with less force, thus to reduce the bending component and to increase the compression and shear components.

In the final portion of seat ring travel illustrated between positions 3 and 4 in FIG. 6, resilient member 70 is subjected to primarily a compressive force. This compressive force is caused by resilient member 70 being deformed to substantially fill all voids or space in the pocket for resilient member 70 between groove 56 and the recess so that additional displacement of the seat member only reduces the volume of the resilient member. Because the volume of resilient member 70 is selected as being larger than the volume of groove 56 some compression will occur before the seat member is in the final resting position against end wall 34. Although it is desirable to size the resilient member slightly smaller than the smallest volume of the grooved portion of the seat member to insure sealing, this is not essential because of the unique cooperating arrangement of the radially disposed abutments of the body recess and seat member. FIG. 5 shows the position of the seat assembly in a position corresponding to position 4 on the diagram of FIG. 6.

In addition to sealing between the seat member and the recess due to deformation by the resilient member by displacement of the seat member alone the fluid pressure in the valve chamber assists in such sealing. Referring to FIGS. 4 and 5, fluid pressure in valve chamber 14 can enter the space between recess annular wall 40 and the periphery of seat member 26 to urge resilient member 70 into groove 56. Compression of resilient member 70 between the abutments 66 and 38 establishes primary sealing with the fluid pressure urging resilient member 70 to assist in a secondary capacity.

Referring to FIG. 4, such illustrates the position of gate member 24 and the valve assembly of this invention at an intermediate point of the seat ring displacement. This generally corresponds to a position between positions 2 and 3 on the force-travel diagram of FIG. 6. In this position, downstream resilient member 70 is subjected to bending loading as well as shear loading because it is being bent or displaced radially inwardly into the bottom of groove 56. Side 72 of resilient member 70 can be partially or wholly in contact with inclined surfaces 62 of groove 56. As the valve seat assembly moves from the position shown in FIG. 3 to the position shown in FIG. 4, the fluid contained in the chamber formed between resilient member 70 and groove 56 can be displaced into passages 43 and 67. Fluid in passageway 67 can flow via seat face groove 69 into valve chamber 14. During travel of downstream seat ring 26 between positions 2 and 3 on the force-travel diagram the compressive loading on resilient member 70 increases at a lesser rate per unit of travel than during the initial loading between positions 0 and 2 because of displacement of the resilient member into the bottom groove 56.

Referring now to FIG. 5 wherein the seat assembly is shown in its maximum displaced position with end wall 46 resting in flush contact with adjacent end wall 34, resilient member 70 is compressed a maximum amount. The position of the seat assembly in FIG. 5 corresponds to point 4 on the force-travel diagram of FIG. 6. In this position the loading of resilient member 70 is a maximum and preferably such is displaced substantially into the bottom of groove 56. Upon displacement of the downstream seat ring between positions 3 and 4 on the force-travel diagram, the loading on resilient member 70 is substantially compressive loading because the resilient member is displaced substantially into the bottom of groove 56 and additional loading is caused by the displacement between abutment 38 and reduced diameter annular wall 36. Loading between positions 3 and 4 is substantially all compressive because resilient member 70 is deformed to fill or substantially fill groove 56, thus additional displacement of the seat member into the recess only reduces the volume of resilient member 70 without significantly changing its shape. Additionally, with the seat assembly positioned as shown in FIG. 5, seat ring face seal member 50 is compressed sufficiently to place sealing surface 48 in flush metal-to-metal sealing contact with gate downstream sealing surface 106.

The novel peripheral groove structure in the seat member in this seat construction can be manufactured without requiring small tolerances, thus permitting less expensive manufacture and permitting a free interchange of parts. The unique peripheral groove, body recess, and resilient member shape permit a seal and a springlike function which does not require extreme precision in manufacture to prevent overstressing or damaging the resilient member.

Upon release of the fluid pressure from the upstream side of the valve or moving gate 25 to the open position the seat assembly will move from the position shown in FIG. 5 to the position shown in FIG. 3. This movement is due to the force created by the compression of downstream resilient member 70 urging both of the seat members and the gate member in the upstream direction until this force is substantially equivalent to the force of upstream resilient member 70A being compressed.

For a through conduit style gate valve member 24 as shown in FIG. 1 both of the seat members will remain in the spaced relation as shown on both their upper and lower portions regardless of the position of the gate member. It is to be understood that this seat construction can be used with gate members which are not the through conduit style and do not have the aperture 30 therethrough. In the event non-through conduit gate members are used with the seat construction of this invention, it may be necessary to restrain at least the lower portion of the seat members from displacement into the portion of the valve chamber occupied by the gate member when in the closed position. Because there are numerous structures which will accomplish retention of seat members in the recesses, none are shown here; however, this shall be understood as not limiting or restricting the scope of the invention.

Seat ring members 24 and 26 fit loosely within the associated recesses for floating back and forth movement and end walls 46A, 46 are spaced from end walls 94, 34 of the associated recesses upon assembly. Thus, seat ring members 24 and 26 are exposed and responsive to fluid pressure from both the bore and the valve chamber to provide fluid pressure actuated seat member.

A lubricant or a sealant can be injected into the valve seat assembly from the exterior of the valve body when the valve is in use. An injection device such as a hand operated pump is connected with an injection port in valve body 12 and material such as a valve sealant compound is injected through passageway 43, resilient member passageway 79, passageway 67, and seat face groove 69 to adjoining faces of seat 26 and gate 25. Both upstream and downstream seat assemblies are constructed to provide for such sealant injection.

What is claimed is:

1. A gate valve structure having a valve body defining a valve chamber with a bore therethrough, a gate member mounted in said valve chamber for movement between open and closed positions relative to said bore, a pair of opposed annular recesses in said body facing the valve chamber and surrounding the bore, and upstream and downstream seat ring members loosely mounted in said pair of recesses for floating back and forth movement relative to the body;

each of said body recesses being defined by stepped inner and outer peripheral wall surfaces extending in a direction generally parallel to the longitudinal axis of the bore and said outer peripheral wall surface being of a larger diameter than said inner peripheral wall surface, an annular abutment joining said inner and outer peripheral wall surfaces and extending in a direction generally transverse to the wall surfaces;

each of said seat ring members having stepped inner and outer peripheral surfaces complementary and in generally parallel facing relation to the adjacent peripheral wall surfaces of the associated body recesses, an annular groove at the juncture of the inner and outer peripheral surfaces defined by opposed sides adjacent the inner and outer peripheral surfaces extending in a direction generally transverse to said peripheral surfaces, one side of the groove being positioned close to the annular abutment forming the body recess and the other side of the groove being spaced longitudinally from and facing said annular abutment, said groove and the adjacent body recess adjacent said abutment forming a pocket between the valve body and the seat ring member; and an annular resilient member mounted in said pocket between the body and the seat ring member adjacent said abutment and said other groove side, said resilient member being deformed between said abutment and said other groove side upon movement of said seat ring member relative to said body.

2. The gate valve structure of claim 1, wherein:
said groove has a shallow portion on the end portion thereof disposed closest to said recess end wall, and a deeper portion at the opposite end portion thereof adjacent said other groove side;
said resilient member having opposed inner and outer peripheral sides thereof respectively in contact with said groove shallow portion and the outer peripheral wall surface of said recess, one end portion of the resilient member extending over said groove deeper portion and being in contact with said other groove side, and an opposite end portion thereof contacting the end of said groove at said shallow portion.

3. The gate valve structure of claim 2 wherein:
said resilient member in a free uncompressed form is of a generally rectangular cross-section positioned within said pocket with its length extending between said opposed sides of said groove, said groove having a bottom extending in a smooth curvature from said deeper portion to said shallow portion;
said groove bottom being shaped so that said resilient member is not deformed beyond the elastic limit of the material of said resilient member.

4. The gate valve structure of claim 1 wherein:
said groove being shaped such that initial displacement of said seat member squeezes said resilient member between said abutment and said other groove side such that substantially only shear forces act on said resilient member; and
said groove being shaped such that displacement of said seat member after said initial displacement results in bending and compressive forces being applied to said resilient member.

5. A valve seat construction for a valve having a housing with a valve chamber therein, a bore through the housing intersecting the valve chamber and a valve member mounted in the valve chamber for movment between open and closed positions relative to said bore, comprising:
an annular recess surrounding said bore and facing said valve member, said recess defining an end wall extending in a direction generally transverse to said bore, an annular wall coaxial with said bore and including a reduced diameter wall portion extending from said recess end wall and joining a larger diameter wall portion at a recess abutment located in a mid-portion of said recess end wall between the reduced diameter and larger diameter wall portions in a direction generally transverse to said bore;
an annular seat member located in said recess having a face portion sealingly engagable with said valve member, said seat member having stepped peripheral wall surfaces complementary and in generally parallel relation to the adjacent wall portions of said recess, said wall surfaces being connected by a seat abutment extending in a direction generally transverse to said bore and facing said recess abutment, and a peripheral groove around said seat member at the juncture of said stepped peripheral wall surfaces; and
an annular resilient member mounted in said peripheral groove and being deformed between said seat abutment and said recess abutment to provide for sealing between said seat member and said recess and to resiliently urge said seat member toward said valve member, said resilient member being deformed further between said abutments and into said groove upon movement of said seat member toward said end wall.

6. A valve seat construction as set forth in claim 5 wherein:
said groove has a shallow portion on the end portion thereof adjacent the abutment of said recess, and a deeper portion on the opposite end portion thereof adjacent said seat member abutment; and
said resilient menber having inner and outer peripheral sides in contact with said groove shallow portion and the outer peripheral wall portion of the recess respectively.

7. A valve seat construction as set forth in claim 5 wherein:
said resilient member in a free uncompressed form is of a generally rectangular cross-section positioned within said groove and extending between said abutments.

8. In a gate valve structure having a valve body defining a valve chamber with a bore therethrough, a gate valve member mounted in said valve chamber for movement between open and closed positions relative to said bore, an annular recess in said body facing the valve chamber and surrounding the bore, a seat ring member loosely mounted in said recess for floating back and forth movement relative to the body;
said body recess being defined by stepped inner and outer peripheral wall surfaces extending in a direction generally parallel to the longitudinal axis of the bore and said outer peripheral wall surface being of a larger diameter than said inner peripheral wall surface, an annular recess abutment between said inner and outer peripheral wall surfaces;
said seat ring member having stepped inner and outer peripheral surfaces complementary to the adjacent peripheral wall surfaces of said body recess, said peripheral surfaces being connected by a seat abutment extending in a direction generally transverse to said bore and facing said recess abutment, an annular groove in the seat ring member generally at the juncture of the inner and outer peripheral surfaces; and
an annular resilient member mounted in said groove between the body and the seat ring member for sealing between the valve body and the seat ring member, said resilient member being deformed between said abutments upon movement of said seat ring member in a direction away from the gate valve member.

9. In a gate valve structure having a valve body defining a valve chamber with a bore therethrough, a gate member mounted in said valve chamber for movement between open and closed positions relative to said bore, a pair of opposed annular recesses in said body facing the valve chamber and surrounding the bore, and upstream and downstream seat ring members loosely mounted in said pair of recesses for floating back and forth movement relative to the body;
each of said body recesses having stepped inner and outer peripheral wall surfaces extending in a direction generally parallel to the longitudinal axis of the bore and said outer peripheral wall surface being of a larger diameter than said inner peripheral wall surface, each body recess further having an annular abutment joining said inner and outer peripheral wall surfaces and an end wall adjacent said inner peripheral wall surface, both said end wall and said annular abutment extending in a direction generally transverse to said peripheral wall surfaces;
each seat ring member having an end wall spaced from the opposed end wall of the associated recess on assembly and being exposed to and responsive to fluid pressure from both the bore and the valve chamber to provide fluid pressure actuated seat members, each of said seat ring members having stepped inner and outer peripheral surfaces complementary and in generally parallel facing relation to the adjacent peripheral wall surfaces of the associated body recesses, an annular groove at the juncture of the inner and outer peripheral surfaces defined by opposed sides adjacent the inner and outer peripheral surfaces extending in a direction generally transverse to said peripheral surfaces, one side of the groove being positioned close to said annular abutment forming the body recess and the other side of the groove being spaced longitudinally from and facing said annular abutment, said groove and the adjacent body recess adjacent said abutment forming a pocket between the valve body and the seat ring member; and
an annular resilient member mounted in said groove between the body and the seat ring member adjacent said abutment and said other groove side, said resilient member being deformed between said abutment and said other groove side upon movement of said seat ring member relative to said body.

* * * * *